United States Patent
Lin (10) Patent No.: US 10,127,404 B2
(45) Date of Patent: Nov. 13, 2018

(54) ACCESS CONTROL METHOD AND TERMINAL DEVICE

(71) Applicant: TENCENT TECHNOLOGY (SHENZHEN) COMPANY LIMITED, Shenzhen, Guangdong (CN)

(72) Inventor: Baike Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 194 days.

(21) Appl. No.: 15/172,945

(22) Filed: Jun. 3, 2016

(65) Prior Publication Data

US 2016/0283741 A1    Sep. 29, 2016

Related U.S. Application Data

(63) Continuation of application No. PCT/CN2015/078658, filed on May 11, 2015.

(30) Foreign Application Priority Data

May 12, 2014    (CN) .......................... 2014 1 0198154

(51) Int. Cl.
    *G06F 21/62*    (2013.01)
    *G06F 3/0484*   (2013.01)
    (Continued)

(52) U.S. Cl.
    CPC ...... *G06F 21/6245* (2013.01); *G06F 3/04847* (2013.01); *G06F 3/04883* (2013.01);
    (Continued)

(58) Field of Classification Search
    CPC ............. G06F 21/6245; G06F 3/04847; G06F 3/04883; G06F 21/36; G06F 21/45; G06F 21/6218
    See application file for complete search history.

(56) References Cited

U.S. PATENT DOCUMENTS

| 4,937,855 A | 6/1990 | McNab |
| 2006/0184609 A1 | 8/2006 | Deng |

(Continued)

FOREIGN PATENT DOCUMENTS

| CN | 101222706 A | 7/2008 |
| CN | 102457619 A | 5/2012 |

(Continued)

OTHER PUBLICATIONS

Notification of the First Office Action of Chinese application No. 201410198154.6, dated Jun. 2, 2017 and translation.

(Continued)

*Primary Examiner* — Oleg Korsak
(74) *Attorney, Agent, or Firm* — Anova Law Group, PLLC (57) ABSTRACT

An access control method and a terminal device are disclosed. The method includes: receiving an unlock password after receiving an instruction for opening an application program; determining an access type corresponding to the unlock password; obtaining display information corresponding to the access type among current display information of the application program; and displaying the obtained display information. An access type is distinguished according to an unlock password, and display information is determined according to the access type, so that the display information can match the unlock password input by a user, and the user can flexibly and secretly control information to be displayed, thereby preventing a risk that private or other important information of the user is seen by a visitor and improving information security.

13 Claims, 5 Drawing Sheets

(51) Int. Cl.
*G06F 3/0488* (2013.01)
*G06F 21/36* (2013.01)
*G06F 21/45* (2013.01)

(52) U.S. Cl.
CPC .............. *G06F 21/36* (2013.01); *G06F 21/45* (2013.01); *G06F 21/6218* (2013.01); *G06F 2221/2141* (2013.01)

(56) References Cited

U.S. PATENT DOCUMENTS

2012/0084734 A1* 4/2012 Wilairat ................ G06F 21/629
715/863
2014/0148128 A1 5/2014 Di et al.

FOREIGN PATENT DOCUMENTS

| CN | 103023649 A | 4/2013 |
|---|---|---|
| CN | 103313343 A | 9/2013 |

OTHER PUBLICATIONS

Internatianal Search Report in international application No. PCT/CN2015/078658, dated Jun. 30, 2015.
English Translation of the Written Opinion of the International Search Authority in international application No. PCT/CN2015/078658, dated Jun. 30, 2015.

* cited by examiner

ACCESS CONTROL METHOD AND TERMINAL DEVICE

CROSS REFERENCE TO RELATED APPLICATIONS

This is a continuation application of International Patent Application No. PCT/CN2015/078658, filed on May 11, 2015, which claims priority to Chinese Patent Application No. 201410198154.6 filed on May 12, 2014, the disclosures of which are incorporated by reference herein in their entirety.

FIELD OF THE TECHNOLOGY

The present disclosure relates to the field of communications technologies, and in particular, to an access control method and a terminal device.

BACKGROUND OF THE DISCLOSURE

In the current age of mobile Internet, relations between applications of an instant message (IM) type and users are becoming increasingly close. People manage and build their own interpersonal relationship networks by using these applications. However, while we are enjoying the comfort and convenience brought by these applications, another problem arises, that is, a problem of personal privacy.

For the problem of personal privacy, an example is described as follows: the products of mobile phones exist as a personal tool in most scenarios, but are not so "personal" in fact. During daily use, we can easily find that there are often families, friends, colleges or other people who take our mobile phone now and then for fun. However, in this case, users very much hope that those pieces of private IM information in the mobile phone do not pop up at this time, and they cannot be seen by other people either.

To solve this problem, a current often-used manner is using an encryption lock program, but this solution cannot solve the technical problem well. Because if an owner of a mobile phone needs to perform program unlocking in front of another person at the request of the person, those pieces of private information may still pop up at an inappropriate time and are therefore seen by the person, which makes the user feel very embarrassed. Therefore, the solution of using an encryption lock cannot provide strong guarantee for user privacy and cannot meet a requirement of users for information security.

SUMMARY

Embodiments of the present invention provide an access control method and a terminal device, which are used to improve information security.

An access control method includes:

at a terminal device having one or more processors and a memory storing programs executed by the one or more processors:

receiving an unlock password after receiving an instruction for opening an application program;

determining an access type corresponding to the unlock password;

obtaining display information corresponding to the access type among current display information of the application program; and displaying the obtained display information on a display screen of a terminal device.

A terminal device includes:
one or more processors;
a memory; and
one or more program units stored in the memory and executed by the one or more processors, the one or more program units including:

a receiving unit, configured to receive an unlock password after receiving an instruction for opening an application program;

a type determining unit, configured to determine an access type corresponding to the unlock password received by the receiving unit;

an information obtaining unit, configured to obtain display information corresponding to the access type determined by the type determining unit among current display information of the application program; and a display unit, configured to display the display information obtained by the information obtaining unit on a display screen of the terminal device.

As can be seen from the foregoing technical solutions, in the embodiments of the present invention, an access type is distinguished according to an unlock password, and display information is determined according to the access type, so that the display information can match the unlock password input by a user, and the user can flexibly and secretly control information to be displayed, thereby preventing a risk that private or other important information of the user is seen by a visitor and improving information security.

BRIEF DESCRIPTION OF THE DRAWINGS

To describe the technical solutions of the embodiments of the present invention more clearly, the following briefly introduces the accompanying drawings required for describing the embodiments. Apparently, the accompanying drawings in the following description show only some embodiments of the present invention, and a person of ordinary skill in the art may still derive other drawings from these accompanying drawings without creative efforts.

DESCRIPTION OF EMBODIMENTS

In order to make the objective, technical solutions, and advantages of the present disclosure clearer, the following describes the present disclosure in further detail with reference to the accompanying drawings. Apparently, the described embodiments are merely some embodiments rather than all embodiments of the present invention. All other embodiments obtained by a person of ordinary skill in the art based on the embodiments of the present invention without creative efforts shall fall within the protection scope of the present disclosure.

Figure 1:
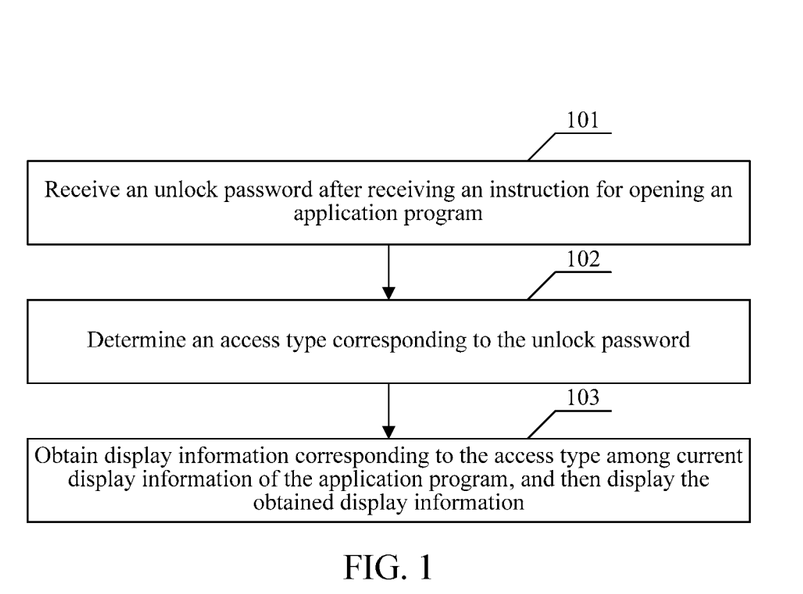
FIG. 1 is a schematic flowchart of a method according to an embodiment of the present invention.

An embodiment of the present invention provides an access control method, as shown in FIG. 1, including:

101: Receive an unlock password after receiving an instruction for opening an application program.

The instruction for opening the application program may have many representation forms, for example, the application program is started or the application program is woken up, where that the application program is started refers to that the application program does not operate at first and then begins to operate, and that the application program is woken up refers to that the application program is operating but is in a "sleep" state. That the application program is woken up may be that the application program is woken up, or may be that an operating system is woken up so that the application program is woken up. In specific application scenarios, the instruction for opening the application program may have different representation forms, and the following are two examples of a scenario in which user information needs to be keep secret, which are specifically as follows: the receiving an instruction for opening an application program includes: locking the application program after a predetermined locking condition is satisfied, and receiving the instruction for opening the application program after receiving an instruction for unlocking the application program; or receiving the instruction for opening the application program.

102: Determine an access type corresponding to the unlock password.

The access type may be set by a user, or may be preset by the application program. The unlock password is usually set by a user, and the unlock password may be a number, a combination of numbers and letters, a vector diagram, or the like. A specific implementation manner for determining the access type corresponding to the unlock password is as follows: the determining an access type corresponding to the unlock password includes: comparing the received unlock password with a pre-saved unlock password set, and determining the access type corresponding to the received unlock password, where the unlock password set includes at least two passwords, and each password is corresponding to an access type.

The unlock password set in this embodiment of the present invention is a pre-saved unlock password set, where the unlock password set includes at least two unlock passwords, and each unlock password is corresponding to an access type. The unlock password set is obtained in the following manner: displaying a setting interface when the application program is started for the first time or the application program is installed for the first time or an access-type setting instruction is received; receiving input of multiple access types by using the setting interface; receiving an unlock password and an information filtering condition that are corresponding to each access type among the multiple access types; and forming the unlock password set by using the multiple access types and the unlock password and the information filtering condition that are corresponding to each access type.

In this embodiment of the present invention, the filtering condition is a rule used to filter all current information of the application program. For example, there are many friends in an IM application, and it may be set that an access type includes all the friends and another access type does not include a few friends. Examples are given in a subsequent embodiment.

103: Obtain display information corresponding to the access type among current display information of the application program, and then display the obtained display information on a display screen of a terminal device.

In this embodiment of the present invention, an access type is distinguished according to an unlock password, and display information is determined according to the access type, so that the display information can match the unlock password input by a user, and the user can flexibly and secretly control information to be displayed, thereby preventing a risk that private or other important information of the user is seen by a visitor and improving information security.

Based on a setting related to information filtering in this embodiment of the present invention, a specific implementation manner for obtaining the display information corresponding to the access type may be as follows: the obtaining display information corresponding to the access type among current display information of the application program includes: obtaining the current display information of the application program, and filtering the current display information of the application program by using an information filtering condition corresponding to the determined access type, to obtain the display information corresponding to the determined access type.

It should also be noted that even if the display information corresponding to the access type includes all the information that can be used for display of the application program, it may be considered that the filtering condition is set in such a manner that filtering is not performed.

In this embodiment of the present invention, in order to further prevent viewing of a setting related to an access type, especially a currently used access type, this embodiment of the present invention further provides a solution of masking an access type, which is specifically as follows: the method further includes: skipping displaying the current access type in a process of displaying display information.

In this embodiment of the present invention, there may be many access types, and the access types may be classified and may be set flexibly according to a specific need. This embodiment of the present invention provides a relatively simple implementation solution, which is specifically as follows: the access type includes: a private mode and a visitor mode, where display information corresponding to the private mode includes all the current display information of the application program, and display information corresponding to the visitor mode does not include display information that is preset by a user to be not displayed among all the current display information of the application program.

It can be learned that because the display information corresponding to the private mode includes all the current display information of the application program, the private mode provides the highest access permission, and is corresponding to an application scenario for private use by the user; and the visitor mode does not include some display information, where the display information that is not included is information that the user hopes is not viewed by another person, and an application scenario corresponding to this mode is an application scenario in which a visitor uses a private terminal of the user.

This following embodiment is described in detail by using an example in which two types of access modes are the private mode and the visitor mode and the application program is WeChat. It should be noted that there may be many types of access modes, which are classified according to access permissions; therefore, the access modes in this embodiment shall not be understood as the only implementation solution of this embodiment of the present invention; and the application program may be any other instant message application besides WeChat, or may be an application program of a non-instant-message type, including a browser, a player, a mailbox, or other various applications that may involve private information that a user does not want another person to see; for example, besides a historical chat record of instant messages, private information may also include a historical use record, contact information, and other various types of information, which is not limited in this embodiment of the present invention. In addition, in this embodiment of the present invention, the unlock password is described by using a gesture (an unlock password in a vector diagram) as an example. It can be understood that the password may actually be any other password such as a number password or a combination of numbers and letters.

This embodiment of the present invention mainly includes four processes:

1. Enter a setting option to enable the visitor mode.

This process is entering a setting option of an application, so as to enable the function of the visitor mode.

2. Separately set a private password, a visitor password, and related options corresponding to the private password and the visitor password.

This process is that after the visitor mode is enabled, a user is required to sequentially draw a gesture password for the private mode and a gesture password for the visitor mode, perform other related settings after setting the passwords, so as to make better use of this function, and set a related option, for example, which information is not displayed in the visitor mode.

3. Enable gesture password protection when a terminal is in a screen lock state or after the application is quitted.

This process is that after the visitor mode is set, as long as the user quits an interface of the application or a standby screen lock state is entered, gesture protection is automatically enabled, so as to protect privacy security of the user.

4. The user enters the application again, and inputs the private password to enter the private mode/inputs the visitor password to enter the visitor mode.

This process is that the user enters the private mode by inputting the private password, or enters the visitor mode by inputting the visitor password, and different types of content are displayed in the two modes.

The following describes the process by using a specific example.

After an IM application is opened, the visitor mode may be enabled in a setting option of the application; and after the visitor mode is enabled, a gesture password for the private mode and a gesture password for the visitor mode are set sequentially, and then other related settings may be performed. After all settings are completed, the visitor mode can be used normally. Once the user quits the application (returns to a home screen) or a mobile phone enters a screen lock sleep state, the visitor mode is automatically enabled, so as to protect privacy security of the user.

It can be learned that the existence of the visitor mode greatly improves privacy security of the user during use of an IM-type application, and by using this mode, two passages are arranged for the application, and different types of content are displayed to users entering through different passages. For example, after enabling the visitor mode, the user sets some private contacts for IMs; in this way, a person entering by using the visitor gesture password will not see any information (including a profile, a chat, and the like) of a related private contact, and even if information sent by a private contact arrives at this time, no related prompt pops up at this side, thereby preventing another person except the user from detecting the information; and if the user performs unlocking by using the private gesture password and enters the application, all related private contacts or private information normally appears in the application, thereby restoring normal use of the application.

A specific operating manner is described as follows:

1. Open and enter a setting interface of the application, to enable the visitor mode.

"Settings" in an operating system of a mobile phone is entered, and "privacy" is selected, and then "enable the visitor mode" is selected in an interface.

2. Draw a private password and a visitor password, and perform related settings.

Figure 2A:
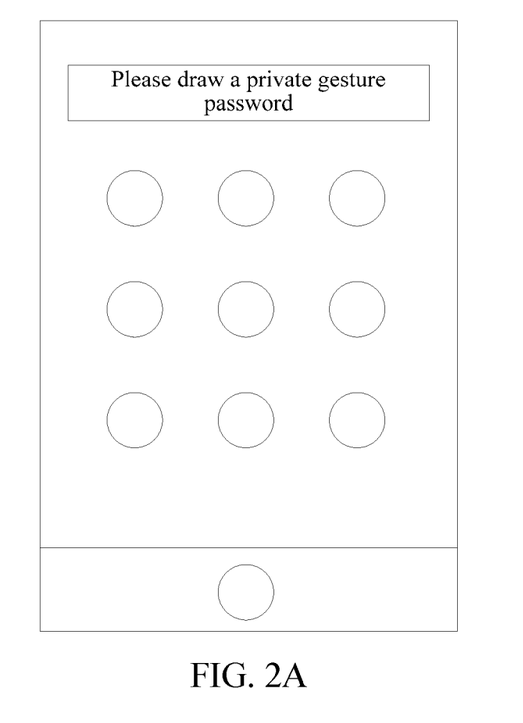
FIG. 2A is a schematic structural diagram of a gesture password setting interface according to an embodiment of the present invention.
Figure 2B:
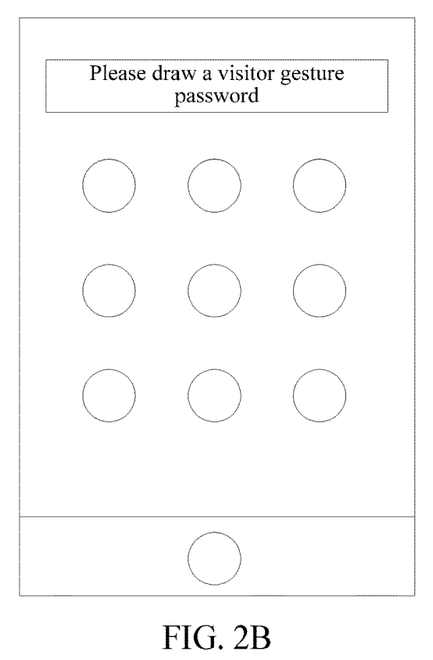
FIG. 2B is a schematic structural diagram of a gesture password setting interface according to an embodiment of the present invention.

As shown in FIG. 2A and FIG. 2B, after a user enables the visitor mode, interfaces for drawing a private gesture password and a visitor gesture password pop up sequentially. In this embodiment of the present invention, in order to prevent an input mistake, it is required that the two passwords both need to be drawn twice and the gesture password is drawn successfully only if two drawn passwords are the same.

Figure 3:
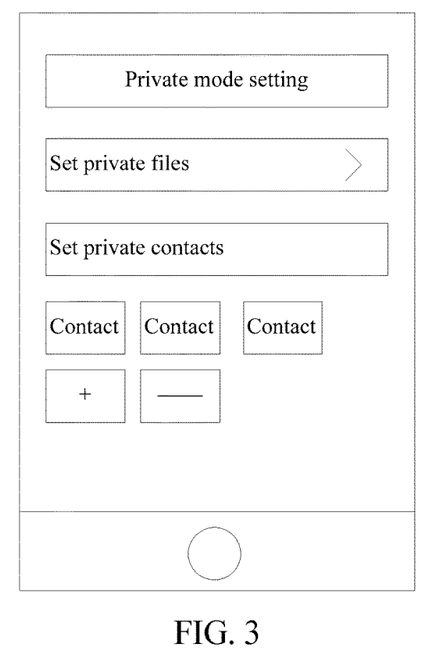
FIG. 3 is a schematic structural diagram of an information setting interface for a private mode according to an embodiment of the present invention.

After the passwords are drawn, the function is enabled successfully, and the user can separately enter the two modes to perform related settings. As shown in FIG. 3, in the private mode, besides private contacts, the user may also set private files. In addition, in the visitor mode, "enable the visitor mode" may also be hidden on the setting interface of the application, so that other people are unable to detect that they are currently using the visitor mode, and hiding the visitor mode during display may be an option selected by default.

3. Open the application again after the application is quitted or after a screen of the mobile phone is locked.

The user enters the application again after quitting the application or locking the screen of the mobile phone to enter a standby state.

Figure 4:
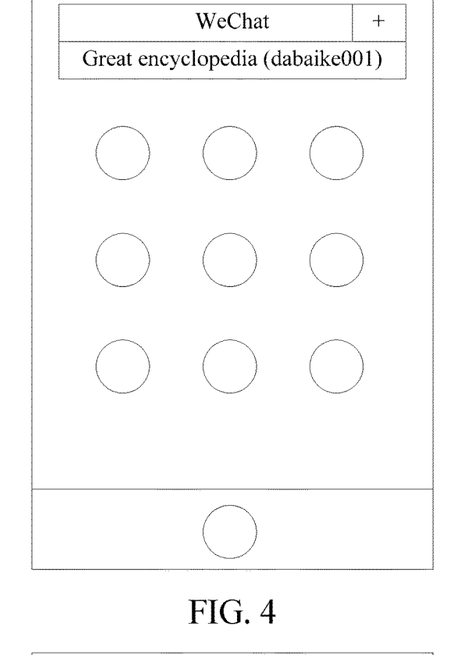
FIG. 4 is a schematic structural diagram of an unlock operation interface according to an embodiment of the present invention.

In this step, as shown in FIG. 4, an unlock interface of WeChat is displayed, where "great encyclopedia (dabaike001)" is a WeChat account.

4. Input a related gesture password finally, so as to enter a corresponding interface.

Figure 5A:
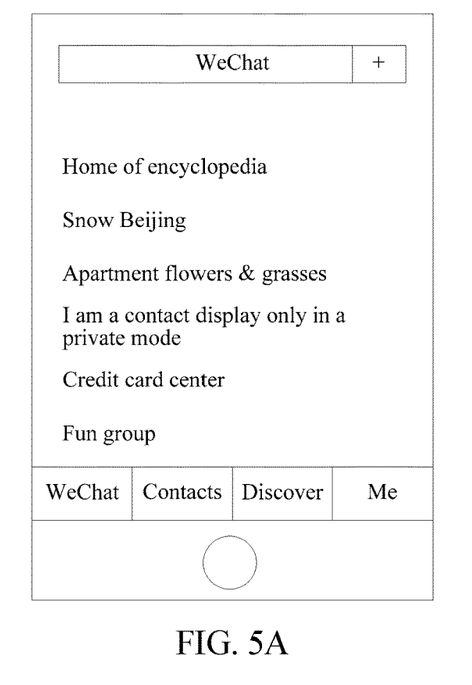
FIG. 5A is a schematic structural diagram of a display interface for a private mode according to an embodiment of the present invention.

In the previous step, the user inputs an unlock gesture password, and in this step, the password is authenticated, and a corresponding access mode is determined. If the user inputs the private gesture, the private mode is entered, as shown in FIG. 5A (in order to clearly show a difference from the visitor mode, refer to black boldfaced words among contacts, which is a contact not displayed in the visitor mode).

Figure 5B:
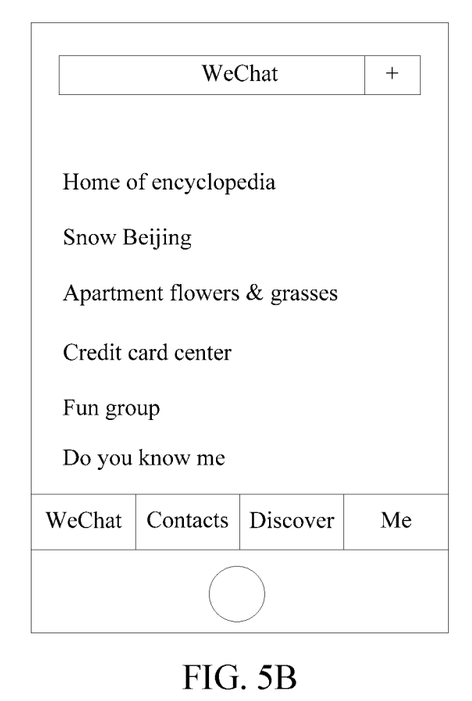
FIG. 5B is a schematic structural diagram of an interface for a visitor mode according to an embodiment of the present invention.

After the user inputs the visitor gesture, the visitor mode is entered, and as shown in FIG. 5B, it can be seen that the contact in the private mode is already hidden, and other people are unable to detect any anomaly.

By enabling a visitor mode of an IM application, a path through which a user enters the application is determined, thereby greatly improving privacy security of the user during use of the IM application and finally improving use experience of a product.

Figure 6:
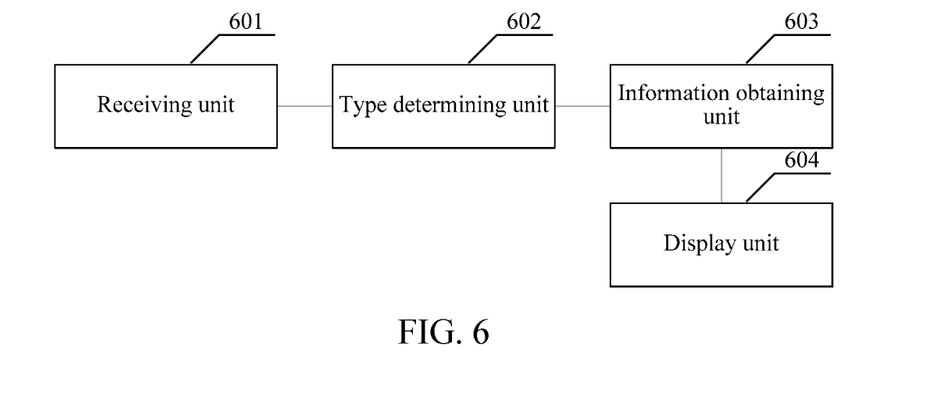
FIG. 6 is a schematic structural diagram of a terminal device according to an embodiment of the present invention.

An embodiment of the present invention further provides a terminal device, as shown in FIG. 6, including:

a receiving unit 601, configured to receive an unlock password after receiving an instruction for opening an application program;

a type determining unit 602, configured to determine an access type corresponding to the unlock password received by the receiving unit 601;

an information obtaining unit 603, configured to obtain display information corresponding to the access type determined by the type determining unit 602 among current display information of the application program; and a display unit 604, configured to display the display information obtained by the information obtaining unit 603 on a display screen of the terminal device.

In this embodiment of the present invention, an access type is distinguished according to an unlock password, and display information is determined according to the access type, so that the display information can match the unlock password input by a user, and the user can flexibly and secretly control information to be displayed, thereby preventing a risk that private or other important information of the user is seen by a visitor and improving information security.

The instruction for opening the application program may have many representation forms, for example, the application program is started or the application program is woken up, where that the application program is started refers to that the application program does not operate at first and then begins to operate, and that the application program is woken up refers to that the application program is operating but is in a "sleep" state. That the application program is woken up may be that the application program is woken up, or may be that an operating system is woken up so that the application program is woken up. In specific application scenarios, the instruction for opening the application program may have different representation forms, and the following are two examples of a scenario in which user information needs to be keep secret, which are specifically as follows: the receiving unit 601 is configured to lock the application program when a predetermined locking condition is satisfied, and receive the instruction for opening the application program after receiving an instruction for unlocking the application program; or receive the instruction for opening the application program.

The access type may be set by a user, or may be preset by the application program. The unlock password is usually set by a user, and the unlock password may be a number, a combination of numbers and letters, a vector diagram, or the like. A specific implementation manner for determining the access type corresponding to the unlock password is as follows: optionally, the type determining unit 602 is configured to compare the received unlock password with a pre-saved unlock password set, and determine the access type corresponding to the received unlock password, where the unlock password set includes at least two passwords, and each password is corresponding to an access type.

This embodiment of the present invention further provides a manner for obtaining the unlock password, which is specifically as follows: the display unit 604 is further configured to display a setting interface when the application program is started for the first time or the application program is installed for the first time or an access-type setting instruction is received; and the receiving unit 601 is further configured to receive access types, unlock passwords corresponding to the access types, and information filtering conditions corresponding to the access types by using the setting interface displayed by the display unit.

In this embodiment of the present invention, the filtering condition is a rule used to filter all current information of the application program. For example, there are many friends in an IM application, and it may be set that an access type includes all the friends and another access type does not include a few friends. Examples are given in a subsequent embodiment.

Based on a setting related to information filtering in this embodiment of the present invention, a specific implementation manner for obtaining the display information corresponding to the access type may be as follows: optionally, the information obtaining unit 603 is configured to obtain the current display information of the application program, and filter the current display information of the application program by using an information filtering condition corresponding to the determined access type, to obtain the display information corresponding to the determined access type.

It should also be noted that even if the display information corresponding to the access type includes all the information that can be used for display of the application program, it may be considered that the filtering condition is set in such a manner that filtering is not performed.

In this embodiment of the present invention, in order to further prevent viewing of a setting related to an access type, especially a currently used access type, this embodiment of the present invention further provides a solution of masking an access type, which is specifically as follows: optionally, the display unit 604 is further configured to skip displaying the current access type in a process of displaying display information In this embodiment of the present invention, there may be many access types, and the access types may be classified and may be set flexibly according to a specific need. This embodiment of the present invention provides a relatively simple implementation solution, which is specifically as follows: the access type determined by the type determining unit 602 includes: a private mode and a visitor mode, where display information corresponding to the private mode includes all the current display information of the application program, and display information corresponding to the visitor mode does not include display information that is preset by a user to be not displayed among all the current display information of the application program.

It can be learned that because the display information corresponding to the private mode includes all the current display information of the application program, the private mode provides the highest access permission, and is corresponding to an application scenario for private use by the user; and the visitor mode does not include some display information, where the display information that is not included is information that the user hopes is not viewed by another person, and an application scenario corresponding to this mode is an application scenario in which a visitor uses a private terminal of the user.

Figure 7:
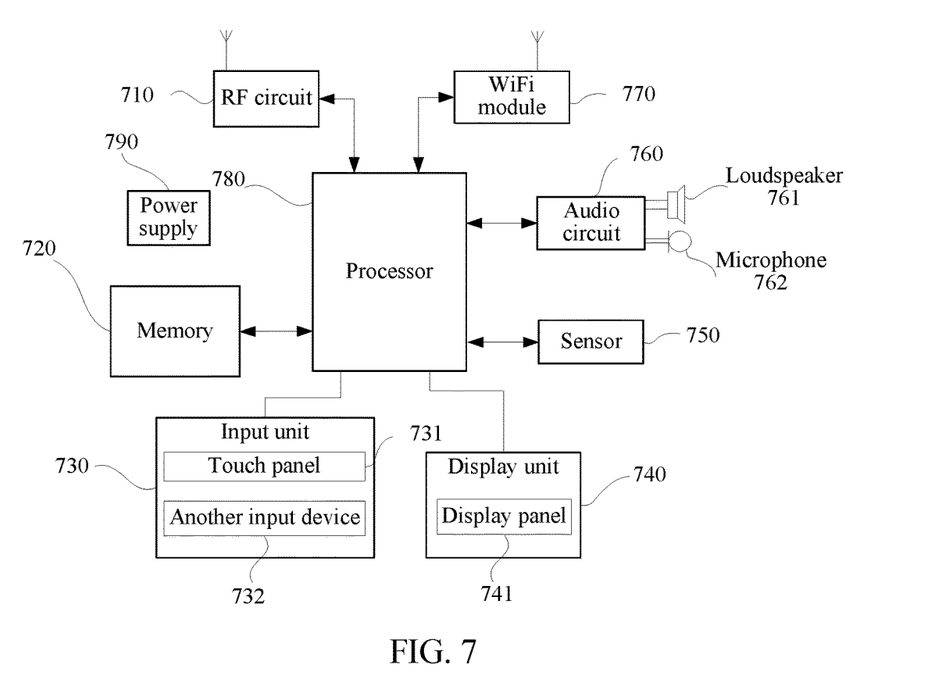
FIG. 7 is a schematic structural diagram of a terminal device according to an embodiment of the present invention.

An embodiment of the present invention further provides another terminal device. As shown in FIG. 7, for ease of description, only parts related to this embodiment of the present invention are shown, and for a specific technical detail that is not disclosed, refer to the part of the method in the embodiments of the present invention. The terminal device may be a mobile phone, a tablet computer, a personal digital assistant (PDA), a point of sales (POS), a vehicle-mounted computer, or any other terminal device. An example in which the terminal device is a mobile phone is used.

FIG. 7 is a block diagram of a structure of a part of a mobile phone related to a terminal device according to an embodiment of the present invention. Referring to FIG. 7, the mobile phone includes components such as a radio frequency (RF) circuit 710, a memory 720, an input unit 730, a display unit 740, a sensor 750, an audio circuit 760, a wireless module 770, a processor 780, and a power supply 790. A person skilled in the art may understand that the structure of the mobile phone shown in FIG. 7 does not constitute a limitation to the mobile phone, and the mobile phone may include more components or fewer components than those shown in the figure, or some components may be combined, or a different component deployment may be used.

The following specifically describes the components of the mobile phone with reference to FIG. 7.

The RF circuit 710 may be configured to receive and send signals during an information receiving and sending process or a call process. Particularly, the RF circuit 710 receives downlink information from a base station, then delivers the downlink information to the processor 780 for processing, and sends designed uplink data to the base station. Generally, the RF circuit 710 includes, but is not limited to, an antenna, at least one amplifier, a transceiver, a coupler, a low noise amplifier (LNA), and a duplexer. In addition, the RF circuit 710 may also communicate with a network and another device through wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 720 may be configured to store a software program and module. The processor 780 runs the software program and module stored in the memory 720, to implement various functional applications and data processing of the mobile phone. The memory 720 may mainly include a program storage area and a data storage area. The program storage area may store an operating system, an application program required by at least one function (such as a sound playback function and an image display function), and the like. The data storage area may store data (such as audio data and an address book) created according to use of the mobile phone, and the like. In addition, the memory 720 may include a high speed random access memory, and may also include a non-volatile memory such as at least one magnetic disk storage device, a flash memory, or another volatile solid-state storage device.

The input unit 730 may be configured to receive input digit or character information, and generate a keyboard signal input related to the user setting and function control of the mobile phone. Specifically, the input unit 730 may include a touch panel 731 and another input device 732. The touch panel 731, which may also be referred to as a touchscreen, may collect a touch operation of a user on or near the touch panel (such as an operation of a user on or near the touch panel 731 by using any suitable object or accessory such as a finger or a stylus), and drive a corresponding connection apparatus according to a preset program. Optionally, the touch panel 731 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 780. Moreover, the touch controller can receive and execute a command sent from the processor 780. In addition, the touch panel 731 may be a resistive, capacitive, infrared, or surface sound wave type touch panel. In addition to the touch panel 731, the input unit 730 may further include the another input device 732. Specifically, the another input device 732 may include, but is not limited to, one or more of a physical keyboard, a functional key (such as a volume control key or a switch key), a track ball, a mouse, and a joystick.

The display unit 740 may be configured to display information input by the user or information provided for the user, and various menus of the mobile phone. The display unit 740 may include a display panel 741. Optionally, the display panel 741 may be configured by using a liquid crystal display (LCD), an organic light-emitting diode (OLED), or the like. Further, the touch panel 731 may cover the display panel 741. After detecting a touch operation on or near the touch panel 731, the touch panel 731 transfers the touch operation to the processor 780, so as to determine the type of the touch event. Then, the processor 780 provides a corresponding visual output on the display panel 741 according to the type of the touch event. Although, in FIG. 7, the touch panel 731 and the display panel 741 are used as two separate parts to implement input and output functions of the mobile phone, in some embodiments, the touch panel 731 and the display panel 741 may be integrated to implement the input and output functions of the mobile phone.

The mobile phone may further include at least one sensor 750 such as an optical sensor, a motion sensor, and other sensors. Specifically, the optical sensor may include an ambient light sensor and a proximity sensor. The ambient light sensor may adjust luminance of the display panel 741 according to brightness of the ambient light. The proximity sensor may switch off the display panel 741 and/or backlight when the mobile phone is moved to the ear. As one type of motion sensor, an acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the mobile phone, are not further described herein.

The audio circuit 760, a loudspeaker 761, and a microphone 762 may provide audio interfaces between the user and the mobile phone. The audio circuit 760 may convert received audio data into an electric signal and transmit the electric signal to the loudspeaker 761. The loudspeaker 761 converts the electric signal into a sound signal for output. On the other hand, the microphone 762 converts a collected sound signal into an electric signal. The audio circuit 760 receives the electric signal and converts the electric signal into audio data, and outputs the audio data to the processor 780 for processing. Then, the processor 680 sends the audio data to, for example, another mobile phone by using the RF circuit 710, or outputs the audio data to the memory 720 for further processing.

WiFi is a short distance wireless transmission technology. The mobile phone may help, by using the WiFi module 770, the user to receive and send e-mails, browse a webpage, access streaming media, and so on, which provides wireless broadband Internet access for the user. Although FIG. 7 shows the WiFi module 770, it may be understood that the WiFi module is not a necessary component of the terminal, and when required, the WiFi module may be omitted as long as the scope of the essence of the present disclosure is not changed.

The processor 780 is the control center of the mobile phone, and is connected to various parts of the mobile phone by using various interfaces and lines. By running or executing the software program and/or module stored in the memory 720, and invoking data stored in the memory 720, the processor 780 performs various functions and data processing of the mobile phone, thereby performing overall monitoring on the mobile phone. Optionally, the processor 780 may include one or more processing units. Preferably, the processor 780 may integrate an application processor and a modem. The application processor mainly processes an operating system, a user interface, an application program, and the like. The modem mainly processes wireless communication. It may be understood that the foregoing modem may also not be integrated into the processor 780.

The mobile phone further includes the power supply 790 (such as a battery) for supplying power to the components. Preferably, the power supply may be logically connected to the processor 780 by using a power management system, thereby implementing functions such as charging, discharging and power consumption management by using the power management system.

Although not shown in the figure, the mobile phone may further include a camera, a Bluetooth module, and the like, which are not further described herein.

In this embodiment of the present invention, the processor 780 included in the terminal also has the following function:

controlling execution of: receiving an unlock password after receiving an instruction for opening an application program; determining an access type corresponding to the unlock password; obtaining display information corresponding to the access type among current display information of the application program; and displaying the obtained display information.

In this embodiment of the present invention, an access type is distinguished according to an unlock password, and display information is determined according to the access type, so that the display information can match the unlock password input by a user, and the user can flexibly and secretly control information to be displayed, thereby preventing a risk that private or other important information of the user is seen by a visitor and improving information security.

The instruction for opening the application program may have many representation forms, for example, the application program is started or the application program is woken up, where that the application program is started refers to that the application program does not operate at first and then begins to operate, and that the application program is woken up refers to that the application program is operating but is in a "sleep" state. That the application program is woken up may be that the application program is woken up, or may be that an operating system is woken up so that the application program is woken up. In specific application scenarios, the instruction for opening the application program may have different representation forms, and the following are two examples of a scenario in which user information needs to be keep secret, which are specifically as follows: the receiving an instruction for opening an application program includes: locking the application program after a predetermined locking condition is satisfied, and receiving the instruction for opening the application program after receiving an instruction for unlocking the application program; or receiving the instruction for opening the application program.

The access type may be set by a user, or may be preset by the application program. The unlock password is usually set by a user, and the unlock password may be a number, a combination of numbers and letters, a vector diagram, or the like. A specific implementation manner for determining the access type corresponding to the unlock password is as follows: the determining an access type corresponding to the unlock password includes: comparing the received unlock password with a pre-saved unlock password set, and determining the access type corresponding to the received unlock password, where the unlock password set includes at least two passwords, and each password is corresponding to an access type.

This embodiment of the present invention further provides a manner for obtaining the unlock password, which is specifically as follows: a manner for obtaining the saved unlock password set includes: displaying a setting interface when the application program is started for the first time or the application program is installed for the first time or an access-type setting instruction is received; and receiving access types, unlock passwords corresponding to the access types, and information filtering conditions corresponding to the access types by using the setting interface.

In this embodiment of the present invention, the filtering condition is a rule used to filter all current information of the application program. For example, there are many friends in an IM application, and it may be set that an access type includes all the friends and another access type does not include a few friends. Examples are given in a subsequent embodiment.

Based on a setting related to information filtering in this embodiment of the present invention, a specific implementation manner for obtaining the display information corresponding to the access type may be as follows: the obtaining display information corresponding to the access type among current display information of the application program includes: obtaining the current display information of the application program, and filtering the current display information of the application program by using an information filtering condition corresponding to the determined access type, to obtain the display information corresponding to the determined access type.

It should also be noted that even if the display information corresponding to the access type includes all the information that can be used for display of the application program, it may be considered that the filtering condition is set in such a manner that filtering is not performed.

In this embodiment of the present invention, in order to further prevent viewing of a setting related to an access type, especially a currently used access type, this embodiment of the present invention further provides a solution of masking an access type, which is specifically as follows: the processor 780 is further configured to skip displaying the current access type in a process of displaying display information.

In this embodiment of the present invention, there may be many access types, and the access types may be classified and may be set flexibly according to a specific need. This embodiment of the present invention provides a relatively simple implementation solution, which is specifically as follows: the access type includes: a private mode and a visitor mode, where display information corresponding to the private mode includes all the current display information of the application program, and display information corresponding to the visitor mode does not include display information that is preset by a user to be not displayed among all the current display information of the application program.

It can be learned that because the display information corresponding to the private mode includes all the current display information of the application program, the private mode provides the highest access permission, and is corresponding to an application scenario for private use by the user; and the visitor mode does not include some display information, where the display information that is not included is information that the user hopes is not viewed by another person, and an application scenario corresponding to this mode is an application scenario in which a visitor uses a private terminal of the user.

Notably, in the foregoing embodiment of the terminal device, the included units are divided merely according to functional logic, but are not limited to the foregoing division as long as corresponding functions can be implemented; in addition, the specific names of the functional units are merely for ease of distinguishing, but are not intended to limit the protection scope of the present invention.

In addition, a person of ordinary skill in the art may understand that all or some of the steps of the foregoing method embodiments may be implemented by a program instructing relevant hardware. The corresponding program may be stored in a computer readable storage medium. The above-mentioned storage medium may be a ROM, a magnetic disk, an optical disc, or the like.

The foregoing descriptions are merely exemplary specific embodiments of the present invention, but are not intended to limit the protection scope of the present disclosure. Any variation or replacement readily figured out by a person skilled in the art within the technical scope disclosed in the embodiments of the present invention shall fall within the protection scope of the present disclosure. Therefore, the protection scope of the present disclosure shall be subject to the protection scope of the claims.

The invention claimed is:

1. An access control method, comprising:
    at a terminal device having one or more processors and memory storing programs executed by the one or more processors:
    pre-saving an unlock password set associated with multiple access types, wherein the unlock password set comprises at least two unlock passwords, and each unlock password is corresponding to one of the multiple access types;
    displaying a lock screen on a user interface of the terminal device, wherein the lock screen is the same for the multiple access types;
    receiving an unlock password after receiving an instruction for opening an application program from the lock screen;
    determining an access type corresponding to the unlock password, wherein the determined access type is not revealed or displayed on the user interface;
    obtaining display information corresponding to the access type among current display information of the application program; and
    displaying the obtained display information on a display screen of the terminal device,
    wherein:
    the multiple access types comprise: a private mode and a visitor mode, wherein display information corresponding to the private mode comprises all the current display information of the application program, and display information corresponding to the visitor mode does not comprise display information that is preset by a user to be not displayed among all the current display information of the application program;
    the application program is an instant messaging application;
    the display information that is preset by the user to be not displayed among all the current display information includes all relevant information of a private contact preset by the user; and
    the method further comprises:
        when the determined access type is the visitor mode and the terminal device is displaying the obtained display information corresponding to the visitor mode, receiving, by the application program, a message sent by the private contact; and
        skipping displaying a prompt related to the message of the private contact in the visitor mode.

2. The method according to claim 1, wherein the receiving an instruction for opening an application program comprises:
    sending a lock instruction when a predetermined locking condition is satisfied, to lock the application program, and receiving the instruction for opening the application program after receiving an instruction for unlocking the application program.

3. The method according to claim 1, wherein the determining an access type corresponding to the unlock password comprises:
    comparing the received unlock password with the pre-saved unlock password set, and determining the access type corresponding to the received unlock password.

4. The method according to claim 1, wherein the unlock password set is obtained in the following manner:
    displaying a setting interface when the application program is started for the first time or the application program is installed for the first time or an access-type setting instruction is received;
    receiving input of multiple access types by using the setting interface;
    receiving an unlock password and an information filtering condition that are corresponding to each access type among the multiple access types; and
    forming the unlock password set by using the multiple access types and the unlock password and the information filtering condition that are corresponding to each access type.

5. The method according to claim 4, wherein the obtaining display information corresponding to the access type among current display information of the application program comprises:
    obtaining the current display information of the application program, and filtering the current display information of the application program by using an information filtering condition corresponding to the determined access type, to obtain the display information corresponding to the determined access type.

6. The method according to claim 1, further comprising:
    skipping displaying the determined access type in a process of displaying display information.

7. A terminal device, comprising:
    one or more processors;
    memory storing an unlock password set associated with multiple access types, wherein the unlock password set comprises at least two unlock passwords, and each unlock password is corresponding to one of the multiple access types; and one or more program units stored in the memory and executed by the one or more processors, the one or more program units comprising:
a display unit, configured to display a lock screen on a user interface of the terminal device, wherein the lock screen is the same for the multiple access types;
a receiving unit, configured to receive an unlock password after receiving an instruction for opening an application program from the lock screen;
a type determining unit, configured to determine an access type corresponding to the unlock password received by the receiving unit, wherein the determined access type is not revealed or displayed on the user interface; and
an information obtaining unit, configured to obtain display information corresponding to the access type determined by the type determining unit among current display information of the application program;
wherein the display unit is further configured to display the display information obtained by the information obtaining unit on a display screen of the terminal device;
the multiple access types comprise: a private mode and a visitor mode, wherein display information corresponding to the private mode comprises all the current display information of the application program, and display information corresponding to the visitor mode does not comprise display information that is preset by a user to be not displayed among all the current display information of the application program;
the application program is an instant messaging application;
the display information that is preset by the user to be not displayed among all the current display information includes all relevant information of a private contact preset by the user; and
the one or more processors are configured to:
when the determined access type is the visitor mode and the terminal device is displaying the obtained display information corresponding to the visitor mode, receive, by the application program, a message sent by the private contact; and
skip displaying a prompt related to the message of the private contact in the visitor mode.

8. The terminal device according to claim 7, wherein the receiving unit is configured to send a lock instruction when a predetermined locking condition is satisfied, to lock the application program, and receive the instruction for opening the application program after receiving an instruction for unlocking the application program.

9. The terminal device according to claim 7, wherein the type determining unit is configured to compare the received unlock password with the pre-saved unlock password set, and determine the access type corresponding to the received unlock password.

10. The terminal device according to claim 7, wherein the display unit is further configured to display a setting interface when the application program is started for the first time or the application program is installed for the first time or an access-type setting instruction is received; and
the receiving unit is further configured to receive input of access types by using the setting interface displayed by the display unit, receive an unlock password and an information filtering condition that are corresponding to each access type among the multiple access types, and form the unlock password set by using the multiple access types and the unlock password and the information filtering condition that are corresponding to each access type.

11. The terminal device according to claim 10, wherein the information obtaining unit is configured to obtain the current display information of the application program, and filter the current display information of the application program by using an information filtering condition corresponding to the determined access type, to obtain the display information corresponding to the determined access type.

12. The terminal device according to claim 7, wherein the display unit is further configured to skip displaying the current access type in a process of displaying display information.

13. A non-transitory computer readable storage medium having stored therein one or more instructions, which, when executed by a terminal device, cause the terminal device to perform:
pre-saving an unlock password set associated with multiple access types, wherein the unlock password set comprises at least two unlock passwords, and each unlock password is corresponding to one of the multiple access types;
displaying a lock screen on a user interface of the terminal device, wherein the lock screen is the same for the multiple access types;
receiving an unlock password after receiving an instruction for opening an application program from the lock screen;
determining an access type corresponding to the unlock password, wherein the determined access type is not revealed or displayed on the user interface;
obtaining display information corresponding to the access type among current display information of the application program; and
displaying the obtained display information on a display screen of the terminal device,
wherein:
the multiple access types comprise: a private mode and a visitor mode, wherein display information corresponding to the private mode comprises all the current display information of the application program, and display information corresponding to the visitor mode does not comprise display information that is preset by a user to be not displayed among all the current display information of the application program;
the application program is an instant messaging application;
the display information that is preset by the user to be not displayed among all the current display information includes all relevant information of a private contact preset by the user; and
the one or more instructions further cause the terminal device to perform:
when the determined access type is the visitor mode and the terminal device is displaying the obtained display information corresponding to the visitor mode, receiving, by the application program, a message sent by the private contact; and
skipping displaying a prompt related to the message of the private contact in the visitor mode.

* * * * *